United States Patent
Geser et al.

(10) Patent No.: US 10,464,708 B2
(45) Date of Patent: Nov. 5, 2019

(54) CONTAINER WITH NECK AND PRE-FORMED SEALING INSERT

(71) Applicant: KOCHER-PLASTIK MASCHINENBAU GMBH, Sulzbach-Laufen (DE)

(72) Inventors: Johannes Geser, Gerlingen (DE); Michael Spallek, Ingelheim (DE); Alexander Hammer, Gaildorf (DE); Alexander Beier, Oberrot (DE)

(73) Assignee: KOCHER-PLASTIK MASCHINENBAU GMBH, Sulzbach-Laufen (DE)

( * ) Notice: Subject to any disclaimer, the term of this patent is extended or adjusted under 35 U.S.C. 154(b) by 121 days.

(21) Appl. No.: 15/311,922

(22) PCT Filed: May 22, 2015

(86) PCT No.: PCT/EP2015/001055
§ 371 (c)(1),
(2) Date: Nov. 17, 2016

(87) PCT Pub. No.: WO2015/185187
PCT Pub. Date: Dec. 10, 2015

(65) Prior Publication Data
US 2017/0113829 A1 Apr. 27, 2017

(30) Foreign Application Priority Data
Jun. 6, 2014 (DE) .......... 10 2014 008 611

(51) Int. Cl.
B65D 1/09 (2006.01)
A61J 1/06 (2006.01)
(Continued)

(52) U.S. Cl.
CPC .............. *B65D 1/095* (2013.01); *A61J 1/067* (2013.01); *B29C 49/20* (2013.01); *B29D 22/003* (2013.01);
(Continued)

(58) Field of Classification Search
CPC .......... A61J 1/067; A61J 1/1412; A61J 1/065; B65D 1/095; B65D 1/09; B65D 39/0023
See application file for complete search history.

(56) References Cited

U.S. PATENT DOCUMENTS

| | | | |
|---|---|---|---|
| 1,842,226 A * | 1/1932 | Williams | B65D 39/0023 215/262 |
| 3,281,002 A * | 10/1966 | Geiss | B65D 39/00 215/355 |

(Continued)

FOREIGN PATENT DOCUMENTS

| | | |
|---|---|---|
| DE | 28 50 386 | 5/1980 |
| DE | 34 45 542 | 6/1985 |

(Continued)

OTHER PUBLICATIONS

Google search for "softening temperature of LDPE".*
(Continued)

*Primary Examiner* — Stephen J Castellano
(74) *Attorney, Agent, or Firm* — Wenderoth, Lind & Ponack, L.L.P.

(57) ABSTRACT

A container, in particular a plastic ampoule produced using a blow molding process, and filled and closed in the production mold, has a sleeve-shaped neck part (4) connected to a container body (2) as an axial extension. The neck part forms a seat (6) for a preformed insert (8) extending along the axis (12) of the neck part (4), and is formed in the production mold, on a peripheral region (14) of the insert (8). At least one sealing element (42; 68) is provided on the (Continued)

insert (8). The sealing element forms a seal in a sealing region surrounding the axis (12), in combination with a contact surface (38) formed on the seat (6) of the neck part (4).

19 Claims, 9 Drawing Sheets (51) Int. Cl.
    *B29C 49/20*     (2006.01)
    *B29D 22/00*     (2006.01)
    *B65B 3/00*     (2006.01)
    *B65B 3/02*     (2006.01)
    *B65B 7/16*     (2006.01)
    *B65D 41/32*     (2006.01)
    *B29K 21/00*     (2006.01)
    *B29L 31/00*     (2006.01)

(52) U.S. Cl.
    CPC .............. *B65B 3/003* (2013.01); *B65B 3/022* (2013.01); *B65B 7/161* (2013.01); *B65D 1/09* (2013.01); *B65D 41/32* (2013.01); *B29C 2049/2026* (2013.01); *B29K 2021/003* (2013.01); *B29L 2031/7158* (2013.01)

(56) References Cited

U.S. PATENT DOCUMENTS

| | | | | |
|---|---|---|---|---|
| 4,474,302 | A | * | 10/1984 | Goldberg ........... B65D 39/0017 215/256 |
| 4,539,172 | A | * | 9/1985 | Winchell ................ B29C 49/04 264/515 |
| 4,746,025 | A | * | 5/1988 | Krautkramer ........... B29C 65/02 156/69 |
| 5,006,118 | A | * | 4/1991 | Yule ....................... A61J 1/067 128/DIG. 24 |
| 5,795,330 | A | | 8/1998 | Tofighi et al. |
| 5,980,482 | A | | 11/1999 | Tofighi et al. |
| 2011/0299910 | A1 | | 12/2011 | Crutchley et al. |

FOREIGN PATENT DOCUMENTS

| | | |
|---|---|---|
| EP | 2 202 042 | 6/2010 |
| WO | 98/15314 | 4/1998 |
| WO | 2008/098602 | 8/2008 |
| WO | 2013/013852 | 1/2013 |
| WO | 2014/009850 | 1/2014 |

OTHER PUBLICATIONS

Google search for "melting temperature of POM".*
International Search Report (ISR) dated Aug. 14, 2015 in International (PCT) Application No. PCT/EP2015/001055.

* cited by examiner

CONTAINER WITH NECK AND PRE-FORMED SEALING INSERT

This application is the national stage (Rule 371) of international application No. PCT/EP2015/001055 filed May 22, 2015.

FIELD OF THE INVENTION

The invention relates to a container, in particular a plastic ampoule produced using a blow molding process and filled and closed in the production mold. The container has a sleeve-shaped neck part connected to a container body as an axial extension. The neck part forms a seat for a pre-formed insert extending along the axis of the neck part, and is formed in the production mold, on a peripheral region of the insert. Moreover, the invention relates to a method, which is provided in particular for producing such a container.

BACKGROUND OF THE INVENTION

Containers of this type, in which the container body is made of a thermoplastic material such as low-density or high-density polypropylene, polyethylene or similar materials that are compatible with the intended container contents, are known, cf. WO 2008/098602 A1. Such containers, for example, produced by the known Bottelpack® method are usually used for receiving and delivering fluids for therapeutic or cosmetic purposes. The liquid is delivered via the insert seated in the neck part of the container body. Its exit or delivery end is preformed in accordance with the intended use. As shown in that document mentioned above, in this respect, for example, an exit forming a dropper can be provided for the direct delivery of drops, for instance eye drops. The dropper opening can be uncovered by unscrewing a container closure cap. For delivery via an injection needle, a port for an injection needle or a plastic mandrel can be provided at the delivery region of the insert. A perforation region that can be pierced by a mandrel or an injection needle may be formed at the insert. Regardless of the specific design of the delivery region, an end cap or closure cap covering the delivery region is removed from the insert before the contents of the container are used.

For safety reasons in the use of such containers, the integral molding of the neck part to the adjoining peripheral region of the insert in the manufacturing mold is decisive. The insert is securely fixed in the seat of the neck part in that way, even in case of stress applied to the delivery region of the insert during use, the seal between the seat and the insert is not adversely affected. Leakage, an increased permeation or a microbiological contamination of the container contents can then be safely ruled out.

SUMMARY OF THE INVENTION

The invention addresses the problem of providing an improved container of the considered type in which a secure seal between the neck part of the container and the insert is ensured and that can be used in particular for medical, cosmetic or industrial purposes, as well as for beverages or foods, suitable filling materials being liquids, suspensions, emulsions, ointments, creams or gels.

According to the invention, this object is basically achieved by a container having, as one essential feature of the invention at least one sealing element provided on the insert. The sealing element forms a seal in a sealing region surrounding the axis in combination with a contact surface formed on the seat of the neck part. If a sealing element is provided on the insert, the process of molding the wall parts of the neck part forming the seat for the insert can be designed in such a manner that a particularly reliable, welded sealing connection is formed in the seat.

In a particularly advantageous way, the sealing element can be formed by a molded part of the insert. The container according to the invention can be manufactured in a particularly simple, efficient and cost-effective manner for the sealing element formed by a part of the insert itself, resulting in a corresponding reduction in the expenditure for providing a separate sealing element.

In particularly advantageous exemplary embodiments of the invention, the molded part forming the sealing element adjoins the end of the peripheral region facing the contact surface of the seat. At the peripheral region, the neck part is formed onto the insert. This forming can be realized in a particularly simple manner using an axial seal between the seat and the insert.

In a particularly advantageous way, the sealing element can be formed by the rim of a ring formed on the insert. The rim faces the contact surface at the seat of the neck part. The ring can advantageously have the form of an axially protruding rib. To ensure particularly reliable sealing, the rib can have a shape tapering towards the rim adjoining the contact surface, to achieve a good sealing effect in relatively narrow, defined sealing region.

In particularly advantageous exemplary embodiments at least one axially protruding structural part is provided on the insert, displaced radially from the ring toward the interior and extending beyond it toward the container body. Because the narrowed collar part formed between the neck part and the container body contacts the inner wall, a support of the insert relative to cross forces acting thereon during use is formed. The structural part can advantageously have the shape of a coaxial truncated cone tapering in the direction of the container body and having a concentric passage in the manner of a bore that opens towards the container body. In doing so, the external conical shape of the structural part may cling to the shape of the funnel-shaped collar part of the container body.

Alternatively, the insert can form a hollow cylinder within the peripheral region. On the inside wall of the hollow cylinder, a plurality of axially protruding structural parts are provided in the form of wings, whose free end regions adjoin the inside of the collar part.

In advantageous exemplary embodiments, a hollow syringe cone is connected to the end of the peripheral region of the insert facing away from container body. The cavity of the syringe cone is flush with the cylindrical passage of the truncated cone, from which it is separated by a web. The web forms a wall part that can be perforated for extraction purposes and can, for instance, be pierced by a hollow plastic mandrel, a double-ended cannula, similar to DIN EN ISO 7885 or DIN 13097-5, or double-pointed injection needles, such as are used for the administration of insulin.

In further advantageous exemplary embodiments, a lockable connection part, having a 6% outer cone (Luer) and a fixedly connected female threaded part in accordance with EN 1707:1996 and sealed by a cap, is connected to the peripheral region of the insert facing away from the container body.

In further advantageous exemplary embodiments, a lockable connection part having an outer cone with a closed tip and a firmly connected female threaded part, similar to EN 1707:1996, that is opened by breaking or twisting the tip off, is connected to the peripheral region of the insert facing away from the container body.

To secure the insert in the seat by integral molding the neck part to the peripheral region of the insert, to ensure extra protection against both axial forces and against torques, surface irregularities can advantageously be formed on the peripheral region of the insert, separated from one another by radially recessed surface sections. This arrangement results in a positive locking between the insert and the neck part of the container body when it is molded thereto.

In the manner known per se for such containers, a closure cap, enclosing the syringe cone or any other differently shaped extraction area forming a predetermined breaking point to enable the detachment from the neck part, can be formed to the end of the neck part facing away from the container body. If the insert is secured against acting torques by a positive locking, the cap can be separated in a convenient and secure way by twisting at the predetermined breaking point. A rotary knob to facilitate a manual twist-off can be integrally formed on the closure cap, for instance.

The object of the invention is also a method provided in particular for manufacturing a container as described above.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure.

DETAILED DESCRIPTION OF THE INVENTION

The invention is described in reference to the drawings, based on exemplary embodiments, in which a container body 2 has a neck part 4. Neck part 4 forms a seat 6 for an insert 8, for the delivery of the liquid pre-stored in the container body 2 when the container is used. In the examples shown, the container body 2 has the shape of a collapsible ampoule having a cross section shaped approximately like a rhombus. The container body 2 is made of plastic material by blow molding, is designed with a total volume of 2 ml for a filling volume of 1.5 ml and has a collar part 10 forming a local restriction at the transition to the sleeve-shaped neck part 4 having a larger diameter than collar part 10. The collar part 10 then has the shape of a funnel coaxial to a container axis 12. The neck part 4 is in the form of a circular cylindrical sleeve, concentric to the axis 12.

Figure 2:
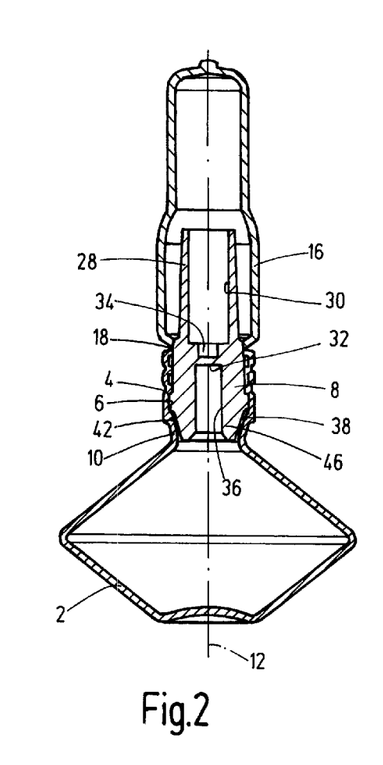
FIG. 2 is a side view in section of the first exemplary embodiment of FIG. 1, rotated by 90° in relation to FIG. 1.
Figure 3:
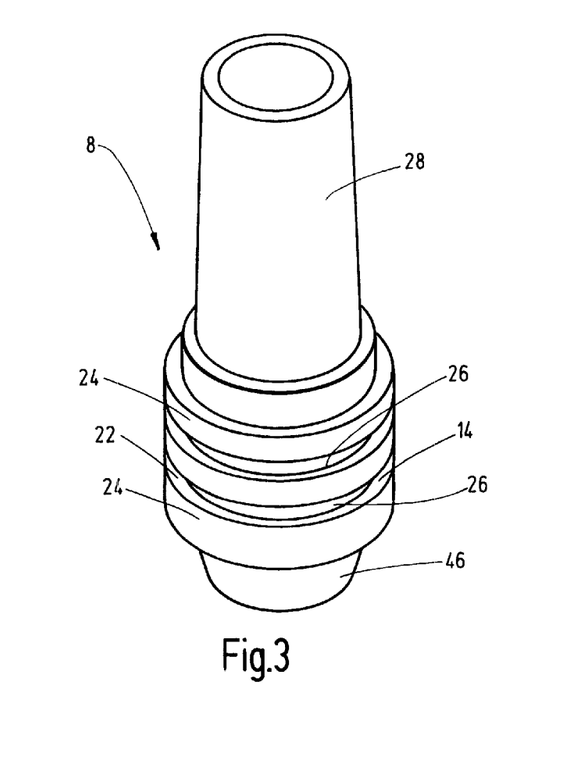
FIGS. 3 and 4 are a perspective view and a front view in section, respectively, of the insert body of the first exemplary embodiment of the container of FIG. 1, magnified approximately 2.5-times in relation to FIGS. 1 and 2.
Figure 4:
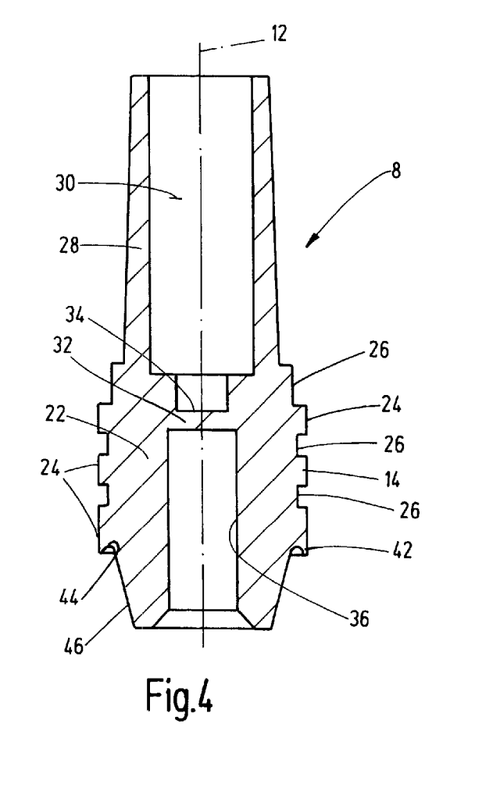

The insert 8, which is separately shown in FIGS. 3 and 4, has the shape of an integrally formed rotary body made of plastic, concentric to the axis 12. Preferably, the same material, or a material of the same class of materials, from which the container body 2, including the collar part 10 and neck part 4, is made, may be provided. In the manufacturing process according to the Bottelpack® method, where a plastic tube is extruded into a blow mold, in which the container body 2 including the collar part 10 is formed using main mold jaws. The adjoining container parts, like the neck part and optionally an adjoining cap, are formed using head jaws. The insert 8 is inserted into the seat 6 of the neck part 4 before the head jaws are closed. The subsequent closing of the head jaws, as is usual in the prior art, is used to form the neck part 4 to the associated peripheral region 14 (cf. FIGS. 3 and 4) of the insert 8. In the example shown in FIGS. 1 and 2, a closure cap 16 is formed to the end of the sleeve part 4. A predetermined breaking point 18 is formed at the transition as a detachable separation point.

As can be seen in FIGS. 3 and 4, the insert 8 has a main part 22, to which the peripheral region 14 is formed. The neck part 4 is formed to peripheral region 14 during the closing of the head jaws. In the performance of the mentioned Bottelpack® process, this forming of the neck part 4 to peripheral region 14 is done after the container contents have been filled into container body 2 by a filling mandrel. Deviating from the form of a smooth cylinder jacket, the main part 22 has surface irregularities at the peripheral region 14, which irregularities are formed by radially recessed surface areas 26 next to un-recessed surface areas 24. In the example of FIGS. 3 and 4, the recessed surface areas 26 are formed by circumferential grooves in the manner of annular grooves extending in the circumferential direction, i.e. the un-recessed surface areas 24 are shaped as annular ribs extending at an axial distance relative to one another. In this shaping of the peripheral region 14, a serration is created when the neck part 4 is molded to the main part 22 of the insert 8, to secure the insert 8 in the seat 6 of the sleeve part 4 using the formed positive lock against any acting axial forces. A syringe cone 28 is formed on the end of the main part 22 of the insert 8 facing away from the seat 6, which cone 28 forms the delivery end of the insert 8. In the example shown, the syringe cone 28 has an axial length that is greater than the length of the main part 22, and has an inner, coaxial cavity 30, which is closed at the end adjoining the main part 22 by a cross web 32, in which a central, recessed part 34 is formed. A coaxial bore-shaped passage 36, which is open at the end of the insert 8 facing the container body 2, is connected to the web 32. The recessed area 34 forms a region of reduced wall thickness in the web 32, which recessed area serves as perforation area for a hollow plastic mandrel. A double-ended cannula during extraction, similar to DIN EN ISO 7885 or DIN 13097-5, can be used to extract container contents through the passage 36.

A step 38 is formed in seat 6 of the neck part 4 at the transition to the collar part 10 (cf. FIG. 2), which seat serves as a contact surface for a sealing element that seals the insert 8 in the seat 6. The sealing element is formed by a molded part of the insert 8 itself. As can be best seen in FIG. 4, a ring 42 is formed on the end of the peripheral region 14 facing the container body 2 along the peripheral rim. An axial recess 44 is connected to that peripheral rim and extends radially inwards in the form of an annular groove, i.e. the ring 42 forms an axially protruding annular rib. The annular rib is tapered, as FIG. 4 clearly shows, towards the axially protruding rim, with which it adjoins the contact surface at the step 38 of the seat 6. The tapered rib shape of the ring 42 forms an effective, narrow sealing region.

Radially inwardly from the recess 44, a coaxial truncated cone 46, at the end of which cone the bore 36 is open, tapers toward the container body 2 and adjoins the main part 22. As shown in FIG. 2, in the inserted position the outer conical surface of the truncated cone 46 adjoins the inside of the funnel-shaped collar part 10. The truncated cone 46 forms a structural part centering the insert 8 in the seat 6 and supports it against transverse forces.

Figure 5:
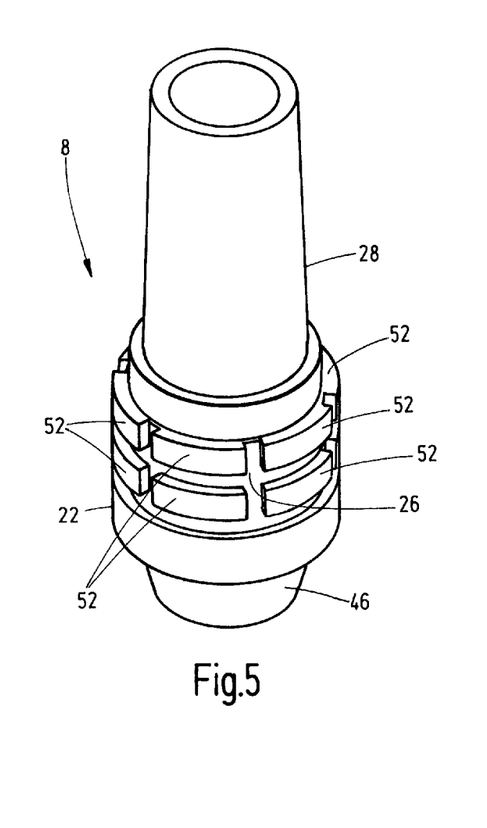
FIGS. 5 and 6 are a perspective view and a front view in section, respectively, of an insert body according to a second exemplary embodiment of the invention.
Figure 6:
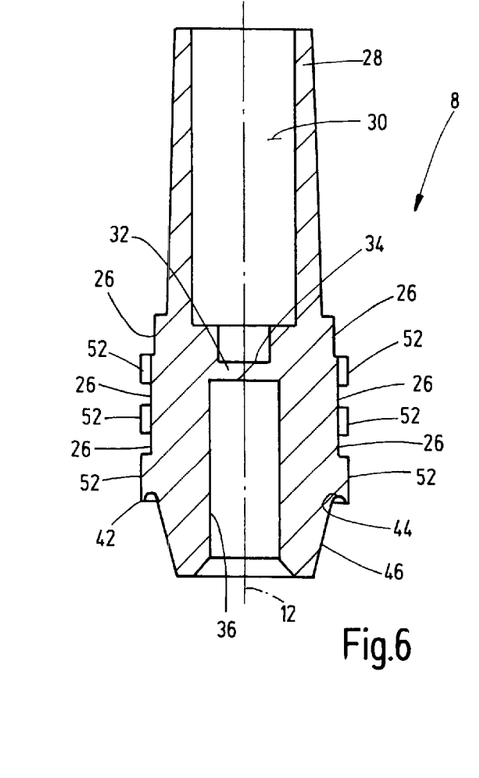

FIGS. 5 and 6 show a modified exemplary embodiment, which differs from the example described above, only by a modified shape of the surface irregularities on the peripheral region 14 of the main part 22 of the insert 8. Instead of the recessed surface areas 26, which extend only in the circumferential direction, in the example of FIGS. 5 and 6, the recessed surface areas 26 extend both in the circumferential direction and in the axial direction. Rib parts 52 are not closed annular ribs and are formed at the peripheral region.

Figure 7:
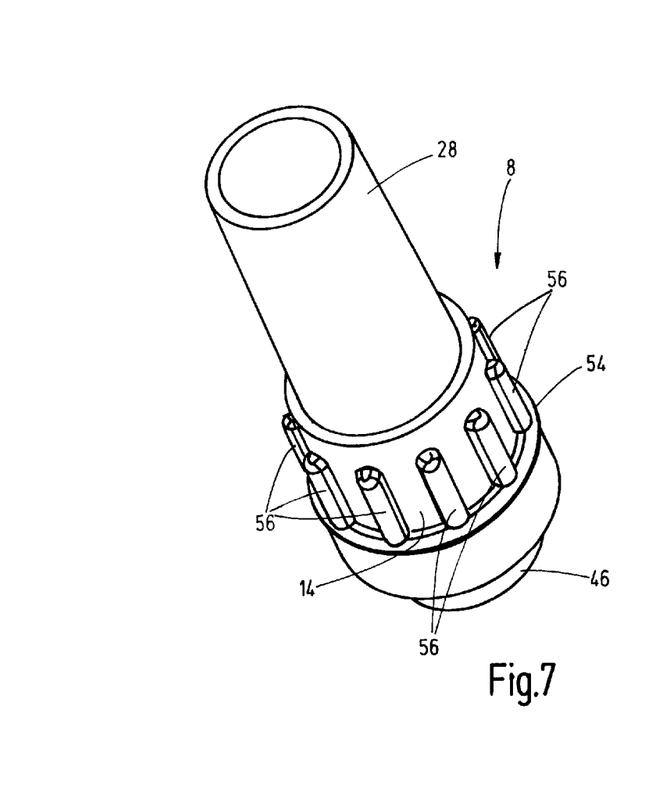
FIGS. 7 and 8 are a perspective and front view in section, respectively, of an insert body according to a third exemplary embodiment of the invention.
Figure 8:
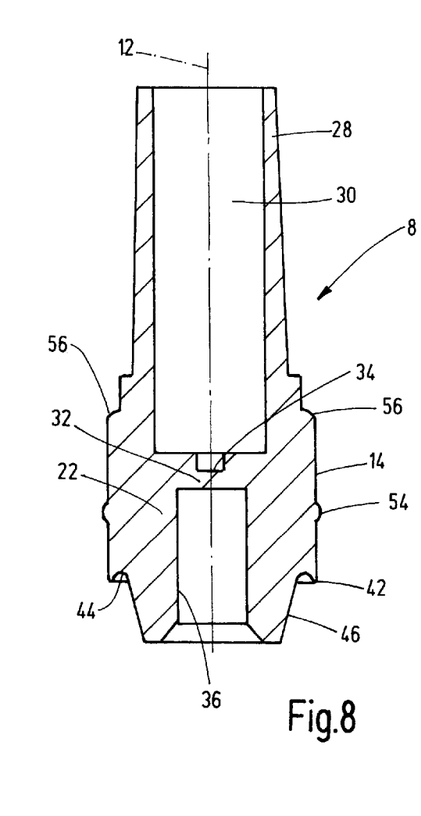

FIGS. 7 and 8 show an exemplary embodiment with a further modified configuration of the peripheral region 14 on the insert 8, which corresponds to the examples described above, concerning the configuration of the sealing element in the form of a ring 42. As shown in FIGS. 7 and 8, a radially protruding annular body 54 has a rounded, bead-shape. From annular body 54 a crown of circumferentially distributed longitudinal ribs 56 extends in the direction of the syringe tip 28 and is provided in approximately the central longitudinal section of the main part 22. The longitudinal ribs 56 terminate at a distance in front of the syringe cone 28. The outside of the longitudinal ribs 56 has a rounded shape, as shown in FIG. 7. In this configuration, having surface irregularities at the peripheral region 14, a positive locking is formed between the neck part 4 and the insert 8 formed thereto, which positive locking secures the insert 8 by the longitudinal ribs 56 against rotation and against axial movement.

Figure 9:
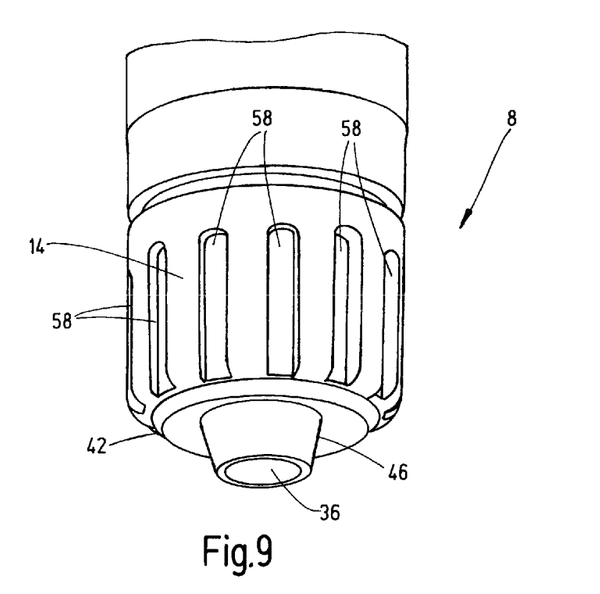
FIGS. 9 and 10 are a partial perspective view and a partial front view in section, respectively, of an insert according to a fourth exemplary embodiment of the invention, as compared to FIG. 3 or 4 even more magnified.
Figure 10:
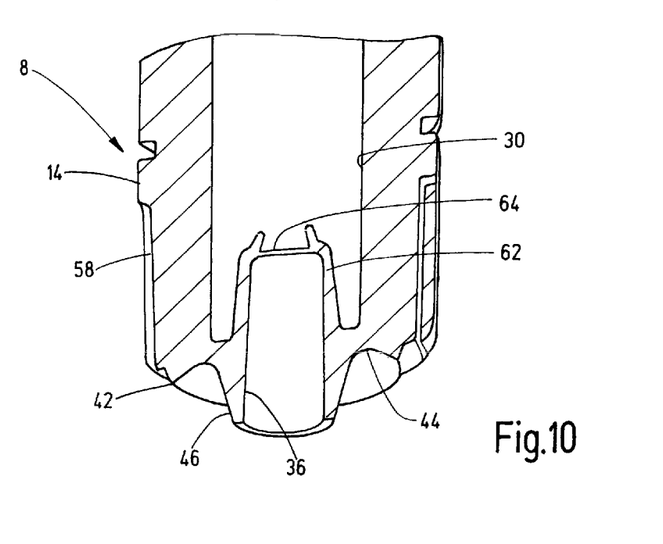

FIGS. 9 and 10 show an example still further modified, in which a crown of longitudinal grooves 58 is distributed around the periphery and disposed at the peripheral region 14 of the insert 8. Further, as shown in FIG. 10, the passage 36, extending in the truncated cone 46 and the cavity 30, extending towards the delivery end, are not separated by a radially extending transverse web 32. However an inner cone 62 extends from the truncated cone 46 into the cavity 30. The inner cone 62 is also shaped as a truncated cone and is closed at the end located in the cavity 30 by a diaphragm 64, which forms the perforation region.

Figure 11:
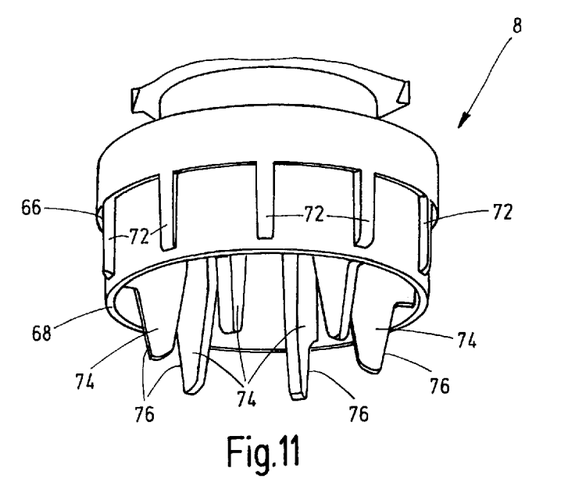
FIG. 11 is a partial, perspective view of an insert according to a fifth exemplary embodiment, drawn in the scale of FIGS. 9 and 10.
Figure 12:
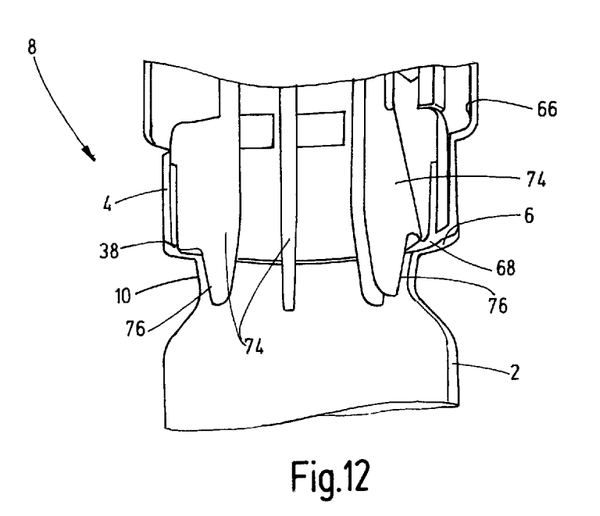
FIG. 12 is a partial perspective view of the insert of FIG. 11 in a position mounted on the neck part of the associated container.

FIGS. 11 and 12 show an exemplary embodiment in which the insert 8 forms a hollow cylinder 66 inside the peripheral region 14. The rim of peripheral region 14, facing the container body 2, forms a ring 68 having a curved surface as a sealing element, adjoining the contact surface at the seat 6 of the neck part 4 formed by the step 38 in a sealing manner. On the outside of the hollow cylinder 66, longitudinal ribs 72 ending at a short axial distance in front of the sealing element forming ring 68, are designed as surface irregularities distributed on the circumference. Axially protruding structural parts in the form of circumferentially distributed wings 74 are formed on the inside of the hollow cylinder 66 and extend in radial planes. The free end parts 76 of wings 74 contact the inside of the collar part 10 at the mounting position, and thus, ensure a good axial centering in the seat 6, even for inserts 8 having larger diameters.

Figure 1:
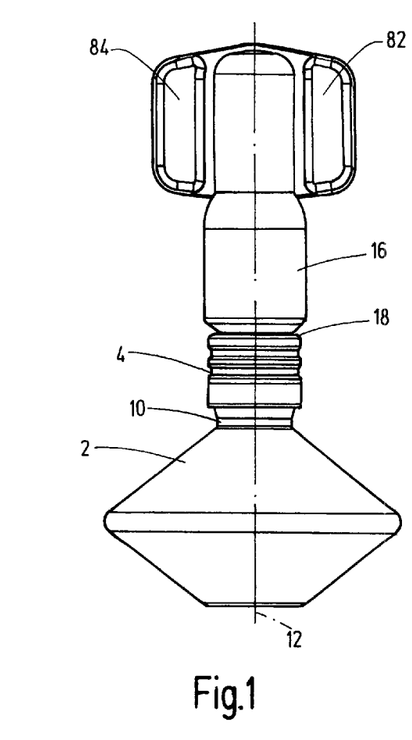
FIG. 1 is a front view of a container according to a first exemplary embodiment of the invention, approximately enlarged by factor of 3 in relation to a practical embodiment.

For easy detachment of the over-mold closure cap 16 at the predetermined breaking point 18, a rotary knob having laterally projecting handle parts 82, 84 is formed at the end part of the closure cap 16, as shown in FIG. 1.

The respective sealing element can apply the individually required sealing effect due to it being inherently stable. Alternatively, the sealing element 42, 68 and melt then form a solid, fluid-impermeable barrier to the other adjacent plastic material, by thermal input. Possibly, resulting excess plastic material from the melting process can be displaced into the hollow groove 44 (cf. FIG. 4), and there serve as an additional filler material for welding, to achieve a homogeneous welded joint in this way.

Figure 13:
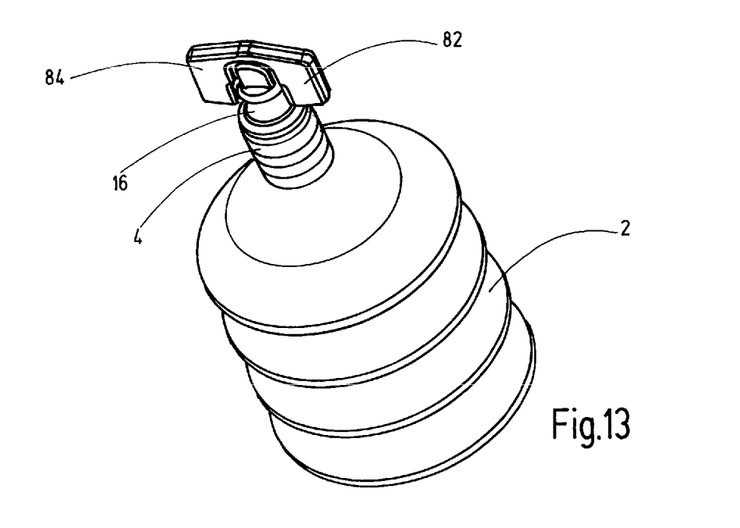
FIG. 13 a perspective view of a container in the form of a small volume bottle according to an exemplary embodiment of the invention.
Figure 14:
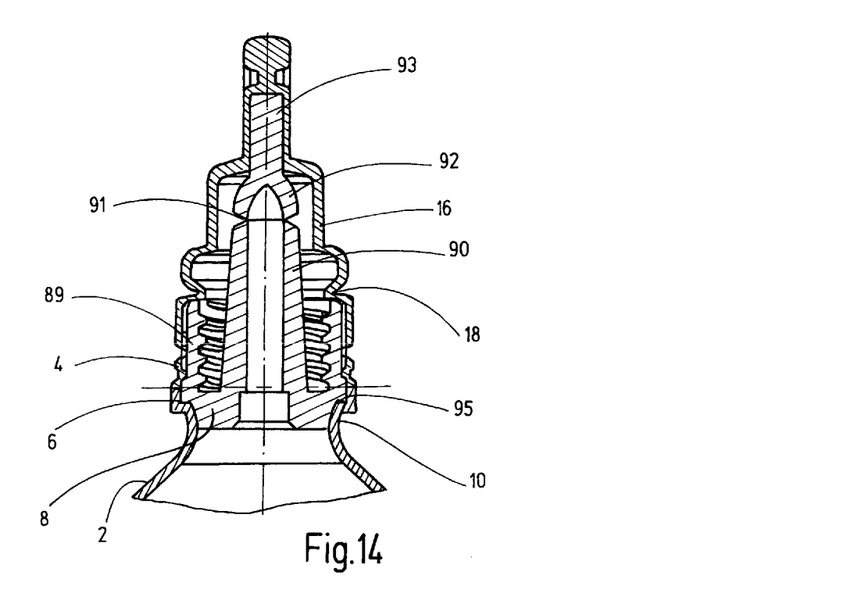
FIG. 14 is a partial side view in section of the container of FIG. 13, wherein only the area of neck part and the closure cap is depicted.

FIGS. 13 and 14 show an alternative embodiment of the container in the form of a small volume vial, intended for a capacity of about 30 ml. The container body 2 is formed by a bellows, which can be compressed during an extraction process. As FIG. 14 shows, the insert 8, which is inserted as an insert part in the sleeve part 4, has an extraction cone in the form of a male Luer Lock 90. It extends coaxially within a sleeve part 89, the outside of which constitutes the peripheral part, to which the neck part 14 is formed. The Luer Lock 90 protruding beyond the end of the sleeve part 89 has a closure part 92 for closing its outlet opening, which closure part is formed to the Luer Lock 90 over a predetermined breaking point 91. The closure part 92 has an axially protruding bar element 93, which is tightly enclosed by the overmold closure cap 16. In this way, a rigid connection is created, i.e. the closure part 92 can be safely taken off by releasing the predetermined breaking point 91 and the separation point 18 together with the overmold closure cap 16 by twisting off the closure cap using the rotary levers 82, 84 integrally formed thereon.

Figures 15, 16, 17:
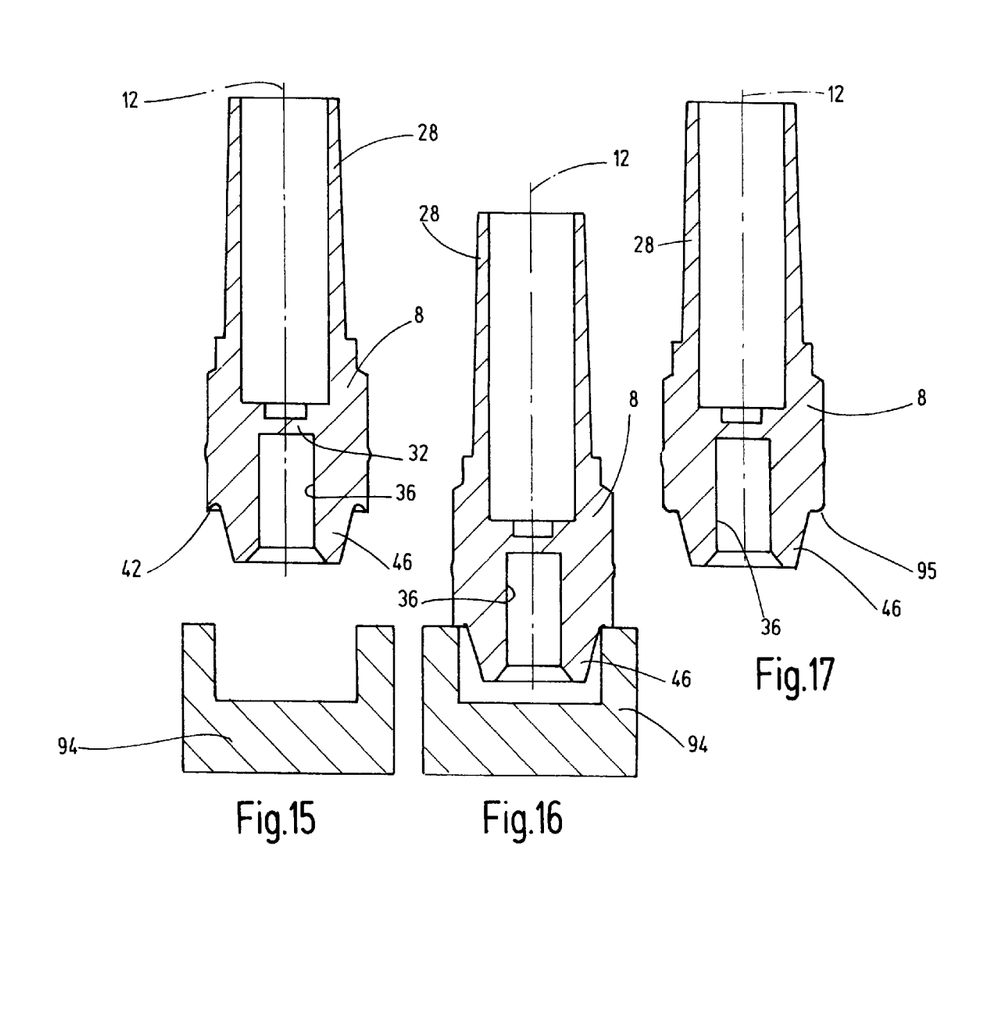
FIG. 15 is a side view in section of the insert of the exemplary embodiment of FIG. 8 and a heating device depicted as a diagram, wherein the state before insertion of the insert into the heating device is shown.
FIG. 16 is a side view in section of the insert and heating device of FIG. 15, with the insert inserted into the heating device.
FIG. 17 is a side view in section of the insert of FIG. 15 in the state after heating in the heating device.

FIGS. 15 to 17 illustrate steps of the method according to the invention that enable a particularly high anti-microbial sealing effect to be obtained between the insert 8 and the container body 2 during manufacture of the container. In the method the insert 8, in particular in the area of the ring 42 forming the sealing element, is heated to a temperature of at least 50° to 70° Celsius before the insertion into the seat 6 of the neck part 4 during the manufacture of the container according to the Bottelpack® process. The formation of the fusion bond or weld during the closing of the head jaws 97 (FIGS. 18 to 20) is then facilitated. FIGS. 15 to 17 illustrate the procedure. Immediately prior to insertion into the blow-molding device, the insert 8 is preheated by a heating device, which in FIGS. 15 and 16 is designed as a heat reflector 94. FIG. 15 shows the state before contact with the heat reflector 94, while FIG. 16 illustrates the heating process. Preheating can be done by direct contact of the sealing element 42; 68 using a heated surface or by radiating heat, for instance using infrared rays or laser beams, or, if the insert 8 is made from correspondingly additized plastics, also by inductive coupling of an electromagnetic field. To promote the formation of the fusion or welded bond, the insert 8 also can be composed of several different materials, e.g. produced by multicomponent injection molding. The sealing element 42; 68, for instance, may be formed from a thermoplastic polymer softening at low temperatures and having good adhesion properties to the polymer material of the container body 2. In particular, a thermoplastic elastomer can be provided (TPE) for this purpose. The other parts of the insert 8 can be made of polymers having higher softening temperatures. In this way, a high dimensional stability of the insert 8 is ensured as well as a tight connection by melting, even at warming to higher temperatures. To achieve a particularly high microbiological tightness after being subjected to mechanical torsional stress, advantageously, the sealing element 42 is located outside the area of the circumferential surface irregularities 24, 26; 52; 54; 56; 58; 72 located on the insert 8, to prevent the torsional moments/forces, for instance during opening, from significantly affecting the sealing element 42.

Figures 18, 19, 20:
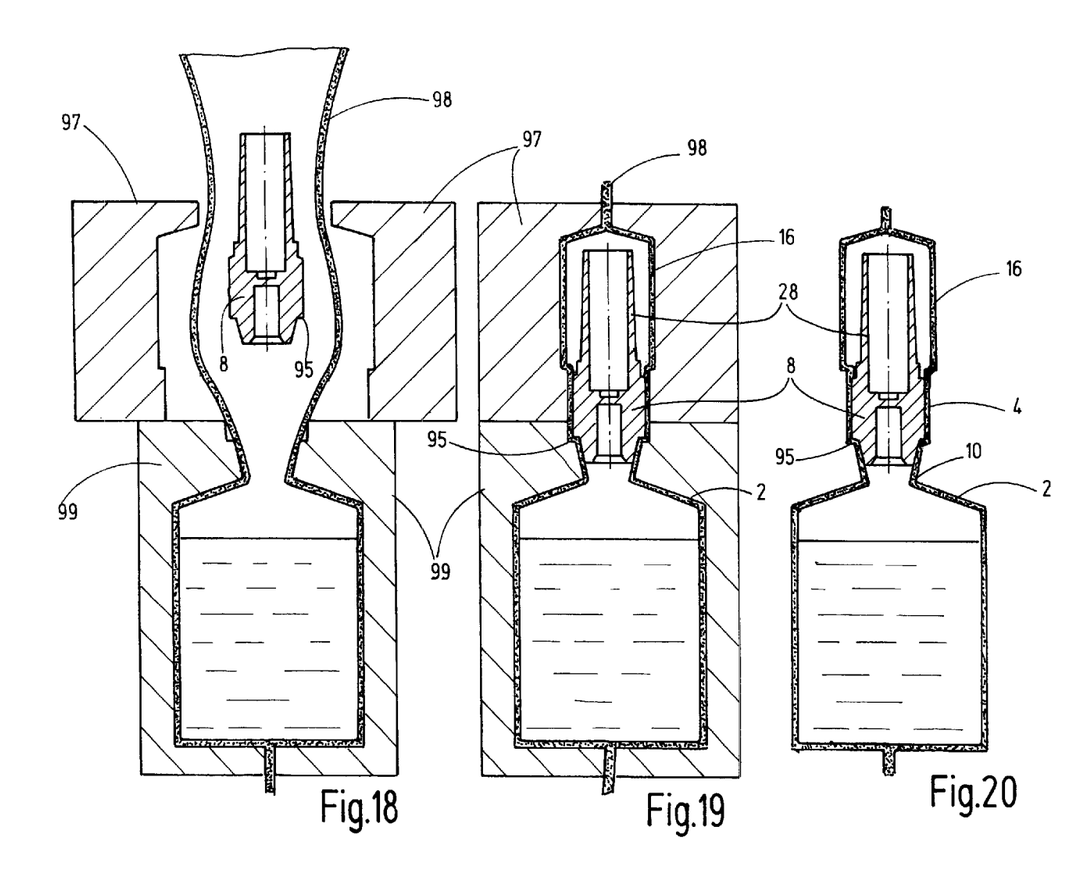
FIG. 18 is a greatly simplified, side view in section of the blow-molding device for manufacturing a container according to the invention, wherein a step of the manufacturing process before the insertion of heated insert is shown.
FIG. 19 is a greatly simplified, side view in section of the device of FIG. 18 in the production step in which the head jaws of the blow-molding device are closed.
FIG. 20 is a schematically simplified, side view in section of the container taken from the blow-molding device of FIGS. 18 and 19.

FIGS. 18 to 20 show the manufacturing steps downstream of the heating process. FIG. 18 shows the insert 8 immediately before the insertion procedure. During the insertion, at first merely an axial pressure force is applied to the insert 8, to ensure a fusion bond or weld, upon which radial forces are applied after a time delay by closing the head jaws 97, to achieve the interlocking between the surface irregularities of the peripheral region of the insert 8. A short delay of even less than one second between these operations has a particularly advantageous effect. FIG. 19 shows the state after the head jaws 97 have been closed. The over-mold closure cap 16 is formed and sealed to produce the closed state of the container as shown in FIG. 20.

For the process of heating, the following temperature ranges have proven useful if suitable materials were used for the tube 98 forming the container and the insert 8 with sealing element 42; 68:

| Container | Material: Insert/Sealing | Temperature Sealing |
|---|---|---|
| LDPE | LDPE/LDPE | up to 95-120° C. |
| LDPE | HDPE/HDPE | up to 130-145° C. |
| PP | PP/PP | up to 150-170° C. |
| PET | PET/PET (amorphous) | up to 70-100° C. |
| PP | PP/TPE | up to 120-160° C. |

While various embodiments have been chosen to illustrate the invention, it will be understood by those skilled in the art that various changes and modifications can be made therein without departing from the scope of the invention as defined in the claims.

The invention claimed is:

1. A container producible using a blow molding system and fillable and closable in a production mold of the blow molding system, the container comprising:
   container body with a hollow interior and a longitudinal axis;
   a sleeve-shaped neck part being connected to said container body as an axial extension along said longitudinal axis of said container body and having a seat therein with a contact surface on said seat, said seat being spaced axially along said longitudinal axis from an open end of said neck part; and
   a pre-formed insert extending along said longitudinal axis and having a peripheral region and a sealing element thereon, said sealing element forming a seal in a sealing region surrounding said longitudinal axis and with said contact surface, said sealing element being an edge of a ring on said insert, said edge facing said contact surface, said sealing element being melted by thermal input forming a welded, solid, fluid impermeable barrier to other adjacent plastic material of said contact surface, said ring being an axially protruding rib, said sealing element being on an inner end of said insert fully inserted in said neck part, with said fluid impermeable barrier being spaced axially along said longitudinal axis from said open end.

2. A container according to claim 1 wherein
   said sealing element comprises a molded part of said insert.

3. A container according to claim 1 wherein
   said sealing element adjoins an axial end of said peripheral region facing said contact surface on said seat.

4. A container according to claim 1 wherein
   said axially protruding rib tapers toward a rim adjoining said contact surface on said seat.

5. A container according to claim 1 wherein
   said insert has an axially protruding structural part extending offset radially inwardly toward said longitudinal axis relative to said sealing element and extending axially beyond said sealing element toward said container body.

6. A container according to claim 5 wherein
   said axially protruding structural part has a shape of a truncated cone, is coaxial to said longitudinal axis, tapers in the direction towards said container body, and has a concentric passage therein opening towards said container body.

7. A container according to claim 6 wherein
   said insert comprises a hollow syringe cone connected on an end of said peripheral region facing away from said container body, said syringe cone having an internal cavity coaxial with said passage in said axially protruding part, said internal cavity and said passage in said axially protruding part being separated by a wall part piercable for extraction of contents in said container body.

8. A container according to claim 7 wherein
   said peripheral region comprises outer surface irregularities of surface parts separated from each other by at least one of radially recessed surface areas or radially raised surface areas arranged axially offset relative to said sealing element towards said syringe cone.

9. A container according to claim 7 wherein
an over-mold closure cap encloses said syringe cone, extends from said end of said peripheral region facing away from said container body and is connected to said end of said peripheral region facing away said container body by a predetermined breaking point enabling separation of said closure cap from said neck part.

10. A container according to claim 9 wherein
said syringe cone comprises an integral, male Luer Lock having a closure part connected to and removable with said closure cap, said closure part and said Luer Lock having a separation point therebetween for opening a free end of said syringe cone.

11. A container according to claim 10 wherein
said closure part comprises a bar extending axially away from said syringe cone and connected to said closure cap in a region of handle parts on said closure cap servable as a turn-off knob on said closure cap.

12. A container according to claim 1 wherein
said insert comprises a hollow cylinder within said peripheral region; and
a plurality of axially protruding wings are circumferentially arranged on an inner wall of said hollow cylinder, free ends of said wings contact an inside of a collar part on an end of said container body adjacent said neck part.

13. A container according to claim 1 wherein
said insert is formed of at least first and second different materials, with at least said first material being softenable at low temperatures.

14. A container according to claim 13 wherein
said first material is a thermoplastic polymer having good adhesion properties to a polymer material of said container body, said second materials having a higher softening temperature than said first material.

15. A container according to claim 13 wherein
said polymer material of said container body comprises a thermoplastic elastomer.

16. A container according to claim 1 wherein
said seat extends radially inwardly towards said longitudinal axis; and
said rib protrudes axially from a free inner end of said insert.

17. A method of manufacturing a container comprising the steps of:
blow-molding in a production mold a container body with a hollow interior, with a sleeve-shaped neck part connected to the container body as an axial extension along a longitudinal axis of the container body and with the neck part having a seat in neck part with a contact surface of the seat, the seat being spaced axially along the longitudinal axis from an open end of the neck part;
filling the container body with contents, while the container body is in the production mold through the neck part;
heating a sealing element on a pre-formed insert with a peripheral region and with the sealing element being an edge of a ring of the insert and with the ring being an axially protruding rib; and
after the heating of the sealing element, inserting the insert into the neck part along the longitudinal axis with the edge of the ring facing and contacting the contact surface forming a welded, solid, fluid impermeable barrier between the sealing element and the seat by melting while in the production mold, the sealing element being on an inner end of the insert fully inserted in the neck part, with the fluid impermeable barrier being spaced axially along the longitudinal axis from the open end.

18. A method according to claim 17 wherein
the insert is inserted in the neck part while in the production mold by applying only an axial pressure force on the insert to ensure a fusion bond of the sealing element with the seat; and
subsequently delaying applying radial forces closing head jaws adjacent and movable relative to the production mold, forming surface irregularities in the neck part connecting the neck part to the peripheral region.

19. A method according to claim 17 wherein
the seat extends radially inwardly towards the longitudinal axis; and
the rib protrudes axially from a free inner end of the insert.

* * * * *